(12) United States Patent
Musselman et al.

(10) Patent No.: US 10,562,576 B2
(45) Date of Patent: Feb. 18, 2020

(54) TRACTION STUD FOR ENDLESS TRACKS

(71) Applicants: Robert Musselman, Midland, MI (US); Mark Musselman, Hope, MI (US)

(72) Inventors: Robert Musselman, Midland, MI (US); Mark Musselman, Hope, MI (US)

( * ) Notice: Subject to any disclaimer, the term of this patent is extended or adjusted under 35 U.S.C. 154(b) by 484 days.

(21) Appl. No.: 15/098,741

(22) Filed: Apr. 14, 2016

(65) Prior Publication Data
US 2017/0297639 A1  Oct. 19, 2017

(51) Int. Cl.
*B62D 55/28* (2006.01)
*B62D 55/32* (2006.01)
*B62D 55/26* (2006.01)
*B62D 55/27* (2006.01)
*B62M 27/02* (2006.01)

(52) U.S. Cl.
CPC ............ *B62D 55/28* (2013.01); *B62D 55/26* (2013.01); *B62D 55/27* (2013.01); *B62D 55/286* (2013.01); *B62D 55/32* (2013.01); *B62M 2027/027* (2013.01)

(58) Field of Classification Search
CPC ...... B62D 55/28; B62D 55/26; B62D 55/286; B62D 55/32; B62D 55/283; B62D 55/27
USPC ......................................... 305/180; 152/210
See application file for complete search history.

(56) References Cited

U.S. PATENT DOCUMENTS

| | | | | | |
|---|---|---|---|---|---|
| 4,041,834 | A | * | 8/1977 | Herkes | F16B 23/0023 411/387.1 |
| 4,858,697 | A | * | 8/1989 | Sherblom | A01B 45/02 152/210 |
| 5,573,316 | A | * | 11/1996 | Wankowski | B62D 55/286 305/165 |
| 5,685,621 | A | * | 11/1997 | Nugent | B62D 55/286 305/165 |
| D415,954 | S | * | 11/1999 | Musselman | D8/386 |
| 5,980,001 | A | * | 11/1999 | Rubel | B62D 55/27 305/162 |
| 6,186,718 | B1 | * | 2/2001 | Fogard | F16B 23/0038 411/403 |
| 6,203,126 | B1 | * | 3/2001 | Harguth | B62D 55/286 305/162 |
| 2004/0174068 | A1 | * | 9/2004 | McNutt | B62D 55/286 305/108 |
| 2008/0219801 | A1 | * | 9/2008 | Toenjes | F16B 25/0015 411/413 |

* cited by examiner

*Primary Examiner* — Scott A Browne

(57) ABSTRACT

A traction stud for endless tracks. The traction stud comprises a base and the base has a center point on a top surface and a center point on a bottom surface. There is an elongated shank rigidly surmounted on the top surface at the center point. The shank has a distal end. The distal end has at least one cutting flute located in it. The shank has a threaded surface. The base has, at the center point of the bottom, a means for torqueing the traction stud.

19 Claims, 3 Drawing Sheets

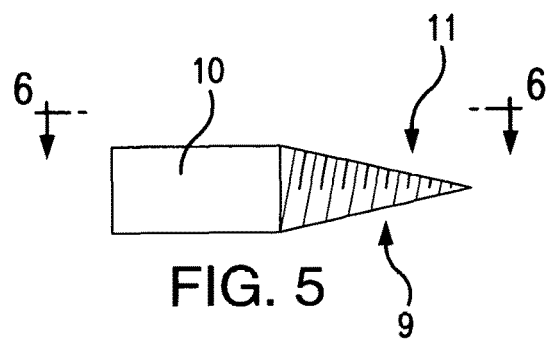
FIG. 5
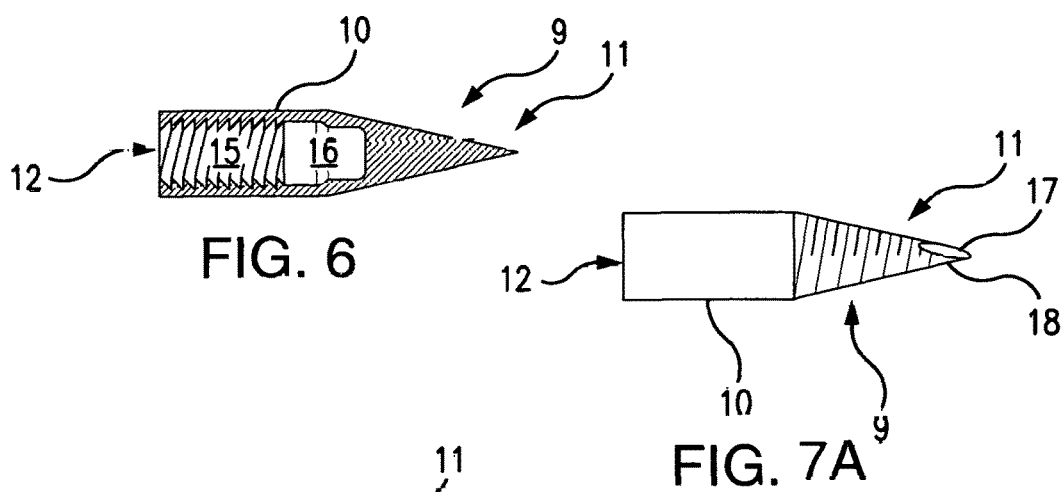
FIG. 6
FIG. 7A
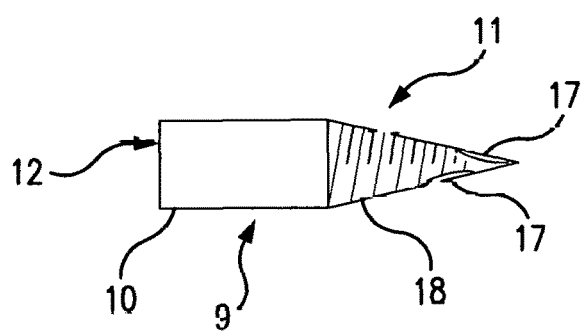
FIG. 7B
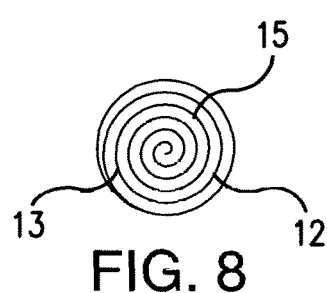
FIG. 8
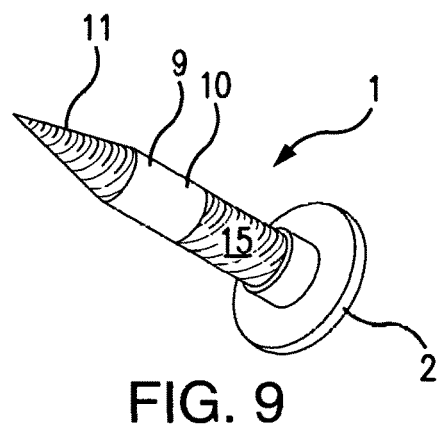
FIG. 9

TRACTION STUD FOR ENDLESS TRACKS

BACKGROUND OF THE INVENTION

For purposes of this invention, "endless tracks" means those tracks that are used on such vehicles as snowmobiles, and the like. Such tracks are constructed with traction studs that give traction and some modicum of control while operating the vehicle.

Traditionally, the studs are placed in the track by drilling holes in the track and then inserting a threaded traction stud into the hole, and then surmounting the threaded stud with a washer or some similar holding device and then by a nut that twists onto the threads.

This is done by drilling holes using a drill and drill bit from the outside of the track when the track is in place on the vehicle and pushing the studs into the drilled holes from the inside of the track and this causes multiple problems owing to the presence of the many components of the suspension system and the like that are in the open inside area of the inside of the track.

In addition, this manner of putting traction studs into endless tracks is compounded by the fact that a normal drill and bit will cut the many layers of cords within the track. Sometimes the track is made up of as many as 1 to 3 layers of fiber, and these layers are located such that the fibers from one layer do not align parallel with the fibers of adjacent layers of fiber. Cutting such fibers weakens the endless track and causes early demise of the track.

It has been found that the traction studs of the instant invention allow placement of the traction studs with a large reduction in the concomitant cutting of the fibers of the track. Further, the method by which the traction studs of this invention are placed in the track allows one to put the traction studs into place from the interior of the track.

THE INVENTION

What is disclosed and claimed herein is a traction stud for endless tracks. The traction stud comprises a base and the base has a center point on a top surface and a center point on a bottom surface. There is an elongated shank rigidly surmounted on the top surface at the center point. The shank has a distal end. The distal end has at least one cutting flute located in it. The shank has a threaded surface. The base has at the center point of the bottom, a means for torqueing the traction stud.

In addition, the traction stud is combined with a threaded nut that conforms to the threaded surface of the elongated shank and there is a washer underlying the nut.

In another embodiment, there is a method of affixing traction studs to an endless track. The method comprises providing a snowmobile track and providing an electric or pneumatic drill affixed with a predetermined driving means.

Thereafter, mounting a traction stud as set forth above on the electric or pneumatic drill, placing a tip of a traction stud against the snowmobile track, and torqueing the traction stud through the snowmobile track. Thereafter, surmounting the traction stud with a nut configured to conform to the threads on the traction stud, and tightening the nut onto the traction stud.

There is yet another embodiment of this invention which is a threaded cap for use on traction studs for endless tracks. The threaded cap comprises a housing, wherein the housing has a first end and a second end. The first end has a hollow opening, and contained within the hollow opening on an interior wall of the housing, there is located bolt threads, the second end being tapered to a distal point. The bolt threads are configured to conform to the threaded surface of the traction stud.

It should be noted that this invention contemplates the use of flutes in the piercing carbide tips of the stud and the use of flutes in the distal end of the stud as well, or in combination.

BRIEF DESCRIPTION OF THE DRAWINGS

FIG. 5 shows a full side view of a cap of this invention.

FIG. 6 shows a crossection view of the cap of FIG. 5 through lines 6-6.

FIG. 7A shows a full side view of a cap of this invention wherein there is shown a flute cut into the distal end.

FIG. 7B is a full side view of a cap of this invention wherein there is shown two flutes cut into the distal end.

FIG. 8 is a full bottom view of the stud.

FIG. 9 is a view in perspective of a stud of this invention with the cap of this invention in place.

DETAILED DESCRIPTION OF THE INVENTION

Figure 1:
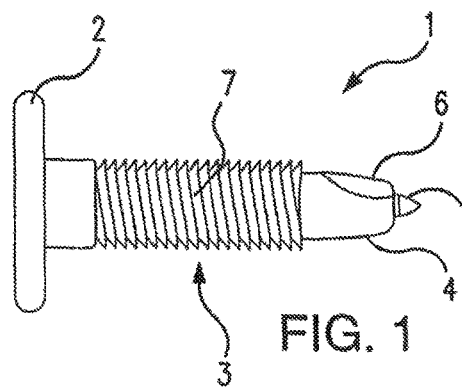
FIG. 1 is a full side view of a traction stud with a side profile of a flute showing in the terminal end.

Turning now to FIG. 1, there is shown a traction stud 1 of this invention, showing the base 2, the elongated shank 3, the distal end 4, the carbide piercing tip 5, a flute 6, and threads 7 on shank 3.

Figure 2:
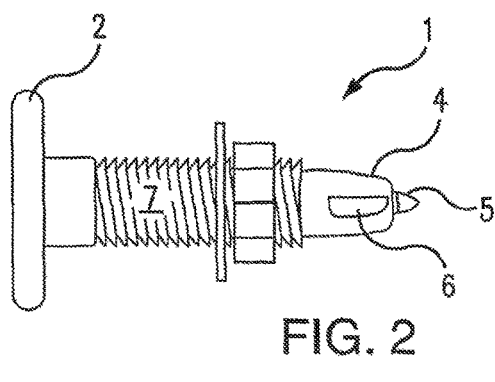
FIG. 2 is a full side view of a traction stud of this invention showing a full frontal view of a flute in the terminal end.
Figure 3A:
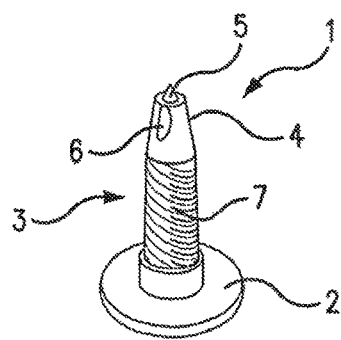
FIG. 3A is a view in perspective of a traction stud of this invention showing a single flute.
Figure 3B:
FIG. 3B is a partial view of a traction stud distal end showing a double flute.
Figure 3C:
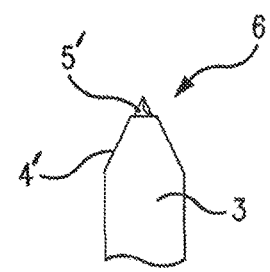
FIG. 3C is a partial view of a traction stud distal end showing a flute in the piercing tip.
Figure 3D:
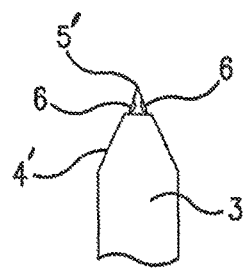
FIG. 3D is a partial view of a traction stud distal end showing two flutes in the piercing tip.

FIG. 2 shows a traction stud 1 of this invention with a full view of the flute 6. FIG. 3A is a view in perspective of a traction stud 1 of this invention showing a flute 6 at the distal end 4 and FIG. 3B shows a distal end 4 with two flutes cut into the distal end. FIG. 3C shows a flute 6 cut into the piercing tip 5' of the traction stud 1 and the distal end 4' without flutes. FIG. 3D shows two flutes 6 cut into the piercing tip 5' of the traction stud and the distal end 4' without flutes.

For purposes of this invention cutting flutes 6 can be straight flutes, spade flutes, brad point flutes, twist flutes, Lip and spur bit, helical twist flutes and the like.

The traction studs 1 of this invention are intended to be "self-tapping" traction studs. Traditionally, in the prior art, the studs are placed in the track by drilling holes in the track and then inserting a threaded traction stud into the hole, and then surmounting with a washer or some similar holding device and then by a nut that twists onto the threads.

This is done by drilling holes using a drill and drill bit from the outside of the track when the track is in place on the vehicle and the stud is inserted from the inside of the track and this causes multiple problems owing to the presence of the many components of the suspension system and the like that are in the open inside area of the inside of the track.

In addition, this manner of putting traction studs 1 into endless tracks is compounded by the fact that a normal drill and bit will cut the many layers of cords within the track. Sometimes the track is made up of as many as three to five layers of fiber, and these layers are located such that the fibers from one layer do not align parallel with the fibers of adjacent layers of fiber. Cutting such fibers weakens the endless track and causes early demise of the track.

It has been found that the traction studs of the instant invention allow placement of the traction studs without undue concomitant cutting of the fibers of the track. During the method of the invention, it was found that most of the fibers merely slide aside and are not cut by the traction studs of this invention. Further, the method by which the traction studs of this invention are placed in the track allows one to put the traction studs into place from the interior of the track.

The method of affixing traction studs to an endless track comprise providing a snowmobile track; providing an electric or pneumatic drill affixed with a predetermined driving means; mounting a traction stud on the electric or pneumatic drill; placing a distal end of a traction stud against the inside of the snowmobile track; torqueing the traction stud through the snowmobile track, and thereafter, the traction stud is surmounted by a washer or the like, and then a nut. The nut is turned down on the threads 7 by utilizing a wrench on the base 2 of the traction stud 1.

Figure 4A:
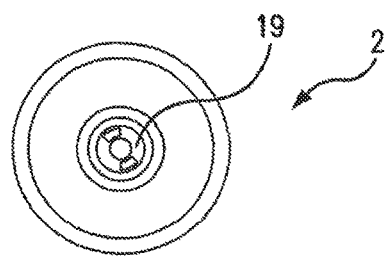
FIG. 4A is a full bottom view of a traction stud showing a standard torque fitting 19.
Figure 4B:
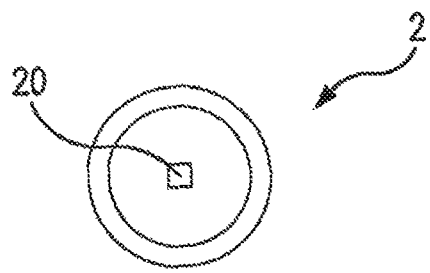
FIG. 4B is a full bottom view of a traction stud showing a square torque fitting 20.
Figure 4C:
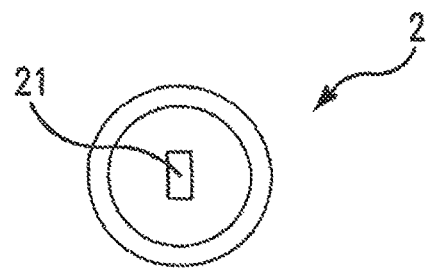
FIG. 4C is a full bottom view of a traction stud showing a rectangle torque fitting 21.
Figure 4D:
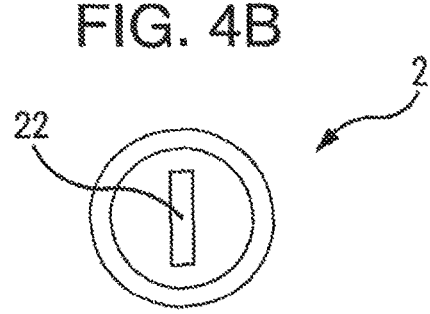
FIG. 4D is a full bottom view of a traction stud showing a flat blade torque fitting 22.
Figure 4E:
FIG. 4E is a full bottom view of a traction stud showing a Phillips torque fitting 23.
Figure 4F:
FIG. 4F is a full bottom view of a traction stud showing a star torque fitting 24.
Figure 4G:
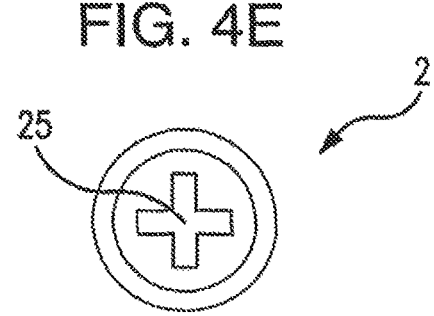
FIG. 4G is a full bottom view of a traction stud showing a cross torque fitting 25.
Figure 4H:
FIG. 4H is a full bottom view of a traction stud showing a six pointed star torque fitting 26.
Figure 4I:
FIG. 4I is a full bottom view of a traction stud showing a triangular torque fitting 27.

Shown in FIGS. 4A to 4H, which are bottom views of the traction stud 1, there is shown examples of the various means by which torque can be applied. Shown is a square opening 20 FIG. 4B, slot opening 21 FIG. 4C, flat blade opening 22 FIG. 4D, Phillips opening 23 FIG. 4E, Star opening 24 FIG. 4F, cross opening 25 FIG. 4G, hex opening 26 FIG. 4H, and triangular opening 27 FIG. 4I.

In another embodiment of this invention, there is shown in FIG. 5 a full side view of a cap 9 of this invention, showing the housing 10 and the tapered end 11. The housing 10 is open on the bottom 12 and the interior surface 13 of the opening 12 is covered with bolt threads 15 as is shown in FIG. 8, which is a full bottom view of the cap 9, and in FIG. 6, which is a cross sectional view of the cap taken through line 6-6 of FIG. 5. The designation 16 is the open space above the threads 15 to allow the insertion of the traction stud 1 into the opening 14.

FIG. 7A is a full side view of a cap 9 showing a flute 17 on the carbide tip 18 of the tapered end 11. FIG. 7B is a bull side view of a cap of this invention showing two flutes cut into the distal end. FIG. 8 is a full bottom view of the stud.

FIG. 9 is a view in perspective of the combination of the cap 9 and the traction stud 1 wherein the cap 9 is screwed onto the bolt threads 15.

The components of this invention are manufactured from metals, and preferred are ferrous metals.

What is claimed is:

1. A traction stud for endless tracks, said traction stud comprising:
   i. a base, said base having a top center point on a top surface and a bottom center point on a bottom surface;
   ii. an elongated shank rigidly surmounted on said top surface at said top center point, said shank having a distal end, said distal end having at least one first cutting flute located therein, said shank having a threaded surface;
   iii. a piercing carbide tip inserted in said distal end of said shank said piercing carbide tip having at least one second cutting flute located therein
   iv. said base having at said bottom center point of said bottom, a means for torqueing said traction stud.

2. In combination, the traction stud as claimed in claim 1 and a threaded nut that conforms to said threaded surface of said elongated shank.

3. In combination, the traction stud and threaded nut as claimed in claim 2 wherein, in addition, there is a washer underlying said nut.

4. The traction stud as claimed in claim 1 wherein said distal end of said shank has two first cutting flutes located therein.

5. The traction stud as claimed in claim 1 wherein said distal end of said shank has three first cutting flutes located therein.

6. The traction stud as claimed in claim 1 that is manufactured out of ferrous metal.

7. The traction stud as claimed in claim 6 wherein the metal is hardened steel.

8. The traction stud as claimed in claim 1 wherein the torqueing means has a hexagonal configuration.

9. The traction stud as claimed in claim 1 wherein the torqueing means has a star configuration.

10. The traction stud as claimed in claim 1 wherein the torqueing means has a cruciform shaped configuration.

11. The traction stud as claimed in claim 1 wherein the torqueing means has a slot configuration.

12. The traction stud as claimed in claim 1 wherein the torqueing means has a rectangular configuration.

13. The traction stud as claimed in claim 1 wherein the torqueing means has a triangular configuration.

14. A method of affixing the traction studs as claimed in claim 1 to an endless track, the method comprising:
   i. providing a snowmobile track;
   ii. providing an electric or pneumatic drill affixed with a predetermined driving means;
   iii. mounting the traction stud as claimed in claim 1 on the electric or pneumatic drill;
   iv. placing the tip of said traction stud against said snowmobile track;
   v. torqueing said traction stud and self-tapping said traction stud through said snowmobile track.

15. The method as claimed in claim 14 wherein after step v., there is an additional step vi., of surmounting the traction stud with a nut configured to conform to threads on said traction stud, and tightening said nut onto said traction stud.

16. The traction stud as claimed in claim 1 wherein the first cutting flute is a helical twist flute.

17. The traction stud as claimed in claim 1 wherein the second cutting flute is a helical twist flute.

18. The traction stud as claimed in claim 1 wherein both the first and second cutting flutes are helical twist flutes.

19. A threaded cap for use on traction studs for endless tracks, said threaded cap comprising:
   i. a housing, said housing having a first end and a second end, said first end being a hollow opening, and contained within said hollow opening on an interior wall of said housing, bolt threads, said second end being tapered to a distal point; wherein there is surmounted on said tapered end, a piercing carbide tip and wherein the piercing carbide tip has at least two cutting flutes in it;
   ii. said bolt threads being configured to conform to a threaded surface of a traction stud for endless tracks.

\* \* \* \* \*